United States Patent [19]

Folus

[11] 4,317,869
[45] Mar. 2, 1982

[54] BATTERY STRUCTURE

[75] Inventor: Stanford G. Folus, Randallstown, Md.

[73] Assignee: Catalyst Research Corporation, Baltimore, Md.

[21] Appl. No.: 226,369

[22] Filed: Jan. 19, 1981

[51] Int. Cl.³ ............................................ H01M 4/00
[52] U.S. Cl. .................................... 429/128; 429/191
[58] Field of Search ............... 429/128, 191, 199, 152, 429/164

[56] References Cited

U.S. PATENT DOCUMENTS 4,284,691 8/1981 Goebel et al. .................. 429/128 X Primary Examiner—Charles F. LeFevour
Attorney, Agent, or Firm—Reed, Smith, Shaw & McClay

[57] ABSTRACT

A multi-cell battery structure in which a stacked array of cells are compressively positioned within an encasement means. Each cell comprises a lithium anode member and a depolarizer pellet adapted to abut the inner surface of encasement means. The depolarizer pellets with or without a cathode screen include a central opening through which lithium from the cell anode is extruded during assembly to form a central column of lithium. The multi-cell array is insulated from the encasement means so that only the depolarizer pellet or associated cathode screen is in contact therewith. A terminal pin, insulated from and positioned through the encasement means is embedded into the central column of lithium to provide electrical contact with battery anodes.

6 Claims, 4 Drawing Figures

4,317,869

BATTERY STRUCTURE

FIELD OF THE INVENTION

The present invention relates to an improved multi-cell battery structure in which the stacked array of cells, each having a lithium anode and a depolarizer, is electrically connected through a central column formed of lithium extruded from the anodes of said array, and in particular to such a structure in which the depolarizers are charge-transfer complexes.

BACKGROUND OF THE INVENTION

The present invention is an improvement over the battery disclosed in the U.S. patent application Ser. No. 136,935, filed Apr. 3, 1980 now U.S. Pat. No. 4,287,273, and assigned to the assignee of the present invention. The battery disclosed therein comprises a plural cell array having the size of a conventional "C" or "D" dry cell that utilizes a lithium halide electrochemical system. Prior to the invention disclosed in said application, "C" and "D" dry cells were well known and commercially available. Notwithstanding the general knowledge relating to electrochemical systems in which depolarizers are of a charge-transfer complex type and the anodes are of various metals such as lithium, see for example U.S. Pat. Nos. 3,653,966, 3,660,163, 3,723,183, 3,817,791, 3,874,929, 3,937,635, 3,957,533, 4,049,890 and 4,072,803, such systems were not used in "C" and "D"-type applications. Although lithium halide type batteries were found to have extended life and capacity for use in devices such as cardiac pacemakers and watches, U.S. Pat. Nos. 3,660,163, 3,674,562 and 4,148,975, they were found to be deficient since they did not have necessary power capacity for high drain applications such as in battery powered flashlights.

The batteries disclosed in Ser. No. 136,935 are not anticipated to have the same current capacity as conventional alkaline or mercury dry cells. They are, however, suitable for use in numerous applications requiring extended life or applications not requiring long periods of high drain.

It is an object of the present invention to provide an improved structure and method of assemblying such batteries to obtain increased performance and reliability. In particular, it is an object of the present invention to provide a battery having more active material together with improved interfacing of the stacked array of cells. In addition, internal connections are eliminated or integrated so as to increase reliability and uniformity of performance of the battery.

SUMMARY OF THE INVENTION

Generally, the present invention comprises a cylindrical encasement means having a base portion a size equivalent to conventional "C" or "D" dry cell batteries. Positioned at the base of the encasement member is an insulating means to prevent short circuit of the array of cells with the encasement means.

The array of cells consists of a plurality of individual cells which are compressively stacked within the encasing means. Each of the individual cells prior to assembly comprises a lithium anode having a central opening and flange positioned about the perimeter of said opening. A pelletized depolarizer having a central opening is positioned on said anode such that the periphery of the central opening of the depolarizer is in contact with the anode flange. The depolarizer has a configuration substantially the same as the inner configuration of the encasing means. The outer perimeter of the depolarizer extends beyond the outer perimeter of the anode so that the anode does not contact the inner surface of the encasement means. Preferably, the depolarizer includes a metal screen which acts as a cathode current collector and which extends slightly beyond the outer perimeter of the depolarizer. In the case of high temperature applications of the cell the screen is not utilized.

The stacked array is formed by the insertion into the encasement means of individual cells. In a presently preferred embodiment, after the insertion of each fifth cell the array thus formed is subjected to a ram having a central opening smaller than the opening of the anode flange. The ram asserts a compacting force on the array such that an extrusion of the lithium from the anode occurs to form a solid central column of lithium by cold welding of the extrusions. The individual cells upon final compaction become a unified array in which the anodes form a solid central column extending through the central openings of the depolarizer pellets.

Positioned over the unified array is a combination of insulator means. A top member is welded to the encasement means to form a hermetical sealed unit. The top means includes a terminal pin electrically insulated therefrom which extends through said insulating means and into the central column for electrical contact.

Preferably, the depolarizer used in the present invention is a charge-transfer complex mixed with an excess of halogen such as disclosed in U.S. Pat. Nos. 4,148,975 or (Ser. No. 735,188, filed Sept. 7, 1979 now U.S. Pat. No. 4,125,833), both of which disclosures are incorporated herein by reference. Where such depolarizer material is used, the lithium rapidly forms a lithium halide layer which protects the central column against shorting. Thus, good electrically contact is made and at the same time possible corrosion or short circuiting is greatly minimized. Other advantages of the following detailed description of presently preferred embodiments taken in connection with the accompanying drawings.

THE PRESENTLY PREFERRED EMBODIMENT

Figure 1:
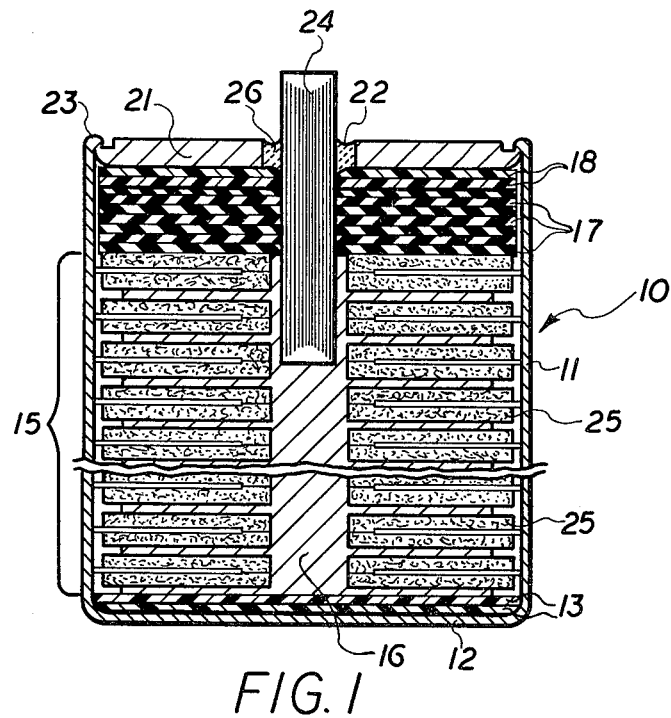
FIG. 1 is a sectional elevation of the battery of the present invention for use in conventional applications.

Referring to FIG. 1 battery 10 of the present invention comprises an encasing means 11 having a base portion 12. Preferably, encasement means 11 is formed from a stainless steel sheet into a cylindrical configuration and size equivalent to a conventional "C" or "D" type dry cell. Coextensively positioned on the base of encasement means 11 are insulating discs 13. In the presently preferred embodiment discs 13 are made from Halar ® type film having a thickness of 0.015 inches.

Compressively positioned within encasement means 11 and on insulating discs 13 is multi-cell array 15. Multi-cell array 15 also includes center column 16. Position on top of multi-cell array 15 are a plurality of insulating discs 17 and 18. Disc 17 are preferably manufactured from Nomex ® sheet, type 410, having a thickness of approximately 0.020 inches. Insulator discs 18 are preferably cut from Halar ® type film having a thickness of approximately 0.015 inches.

Compressively positioned onto insulators 18 is top member 21 having a central opening 22. Top portion 21 is welded to encasement means 11 at periphery 23 to form a hermetic seal. A terminal pin 24 is positioned through opening 22 and electrically insulated therefrom by seal 26. Terminal pin 24 is driven into central column 26. Preferably, terminal pin 24 is fabricated to top portion 21 prior to assembly with top 21. Terminal pin 24 is forced into column 16 during placement of top 21 on the encasement means.

Figure 2:
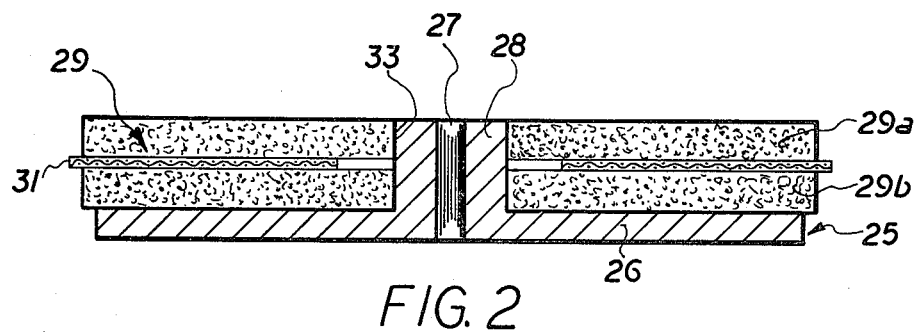
FIG. 2 is a sectional elevation of one of the elements used in the multi-cell array of the battery shown in FIG. 1.

With reference to FIG. 2, multi-cell array 15 comprises a plurality of individual cells 25. Prior to assembly in encasement means 11 each cell comprises a lithium anode 26 having a central opening 27 therethrough. Positioned adjacent to said opening is an annular flange 28. For conventional applications it is preferable to utilize depolarizer pellet 29 having a cathode current collector screen 31. Screen 31 is preferably a stainless steel (type 316) wire cloth which is integrated into the depolarizer 29 by interposing screen 31 between two pellets 29a and 29b. As shown in FIG. 2, pellet 29 includes a central opening 33 adapted to abut and contact annular flange 28 of anode 26.

Figure 3:
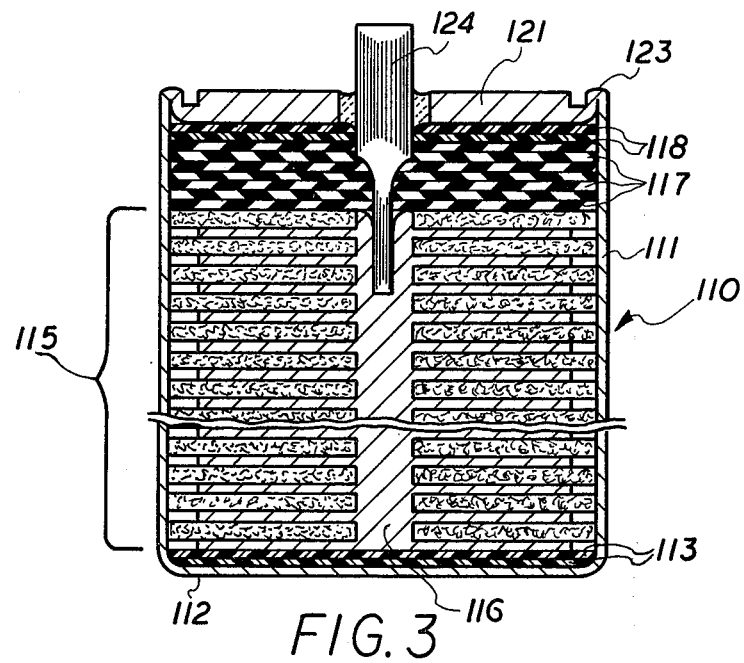
FIG. 3 is a sectional elevation of a battery for use in high temperature applications.
Figure 4:
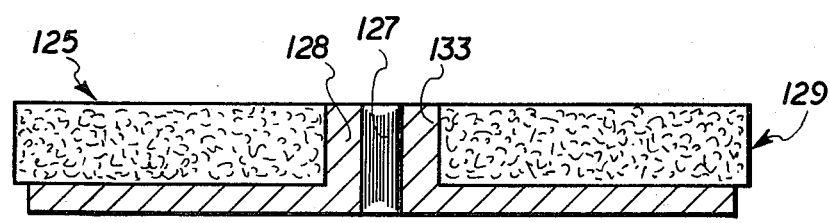
FIG. 4 is a sectional elevation of a cell for use in the multi-cell array of the battery shown in FIG. 3.

Depolarizer 29 is adapted to extend beyond anode 26, and screen 31 is adapted to project beyond the periphery of depolarizer 29. In the embodiment shown in FIG. 1, the dimension of screen 31 is such that it compressively abuts the inner surface of encasement member 11 to make electrical contact therewith. However, it may also be dimensioned as shown in the embodiment of FIG. 3 wherein the depolarizer also contacts the inner surface of encasement means 11. In such case screen 31 is compressively interposed between the outer periphery of depolarizer 29a and the inter surface. As can be seen, screen 31 is foreshortened by having a central opening larger than that of depolarizer 21 so as not to make contact with annular flange 28 and thereby short circuit the cell.

In assemblying the battery shown in FIG. 1, insulator discs 13 are positioned in base 12 of the encasement means 11. A number of cells as shown in FIG. 2 are positioned on top of said insulator discs 13. Preferably after a group of five cells 25 has been positioned in the encasement means the stack is subjected to compaction by forces of preferably about 4,000 pounds by a ram having a central opening somewhat smaller than the outer diameter of annular flange 28. As the force from the ram is applied to the stack of cells 25, lithium from anode 26 extrudes through the central opening 33 of cathode 29. The extruded material flows from the respective anodes and cold welds together to form central column 16. When the last set of cells is compacted a unified, multi-cell array 15, with central column 16, is formed. Insulator discs 17 and 18 are then placed on top of array 15 and terminal pin 24 is pressed into solid lithium column 16 when top portion 21 is positioned and sealed onto encasement means 11. Preferably, several lithium washers are placed on terminal pin 24 prior to assembly which are pressed together during the positioning of top portion 21 so as to form a lithium sheath around the pin as top portion 21 is assembled onto the encasement means. The formation of the lithium sheath protects the terminal pin from corrosion and shorting by iodine by forming, in situ, a lithium halide layer.

While it has been found that compressing every fifth cell provides the desired anode-cathode interface and lithium flow to form central column 16, compacting at other intervals may be found useful. Inasmuch as the presently preferred embodiment shown in FIG. 1 utilizes thirty individual cells, six compactions are necessary in the assembly of such battery. Compacting at lesser intervals increases the manufacturing costs of the battery without providing any apparent advantages and compaction at greater intervals does not afford the desired material flow, interface, or bonding at pressures sustainable by commercially affordable encasement means 11.

Referring to FIGS. 3, a battery 110 is shown wherein elements similar to those shown in FIG. 1 are identified by similar reference numerals. Battery 110 is adapted for use in higher temperature applications. Battery 110 shown in FIG. 3 differs from battery 10 shown in FIG. 1 only with respect to the elimination of screen 31 from the depolarizer. Depolarizer 129 is dimensioned to abut the inner surface of encasement means 111 to provide the necessary electrical contact. Terminal pin 124 has a slightly different shape from that pin 24 of FIG. 1; however, such change is optional.

While presently preferred embodiments of the invention have been shown and described in particularity, the invention may be otherwise embodied within the scope of the appended claims.

What is claimed is:

1. A multi-cell battery comprising
   a. an encasement means having a base portion;
   b. insulator means coextensively positioned on said base portion;
   c. an array of cells compressively intergrated to include a central column, said cells of said array each including a lithium anode and a depolarizer having a central opening, said central column being formed from lithium extruded through said openings by compression of said cells;
   d. second insulator means positioned coextensively over said array and having a central opening therethrough; and
   e. a top means having a terminal pin insulatingly mounted through said top means and extending through said second insulator means into said central column, said top means being hermetically secured to said encasement means.

2. A multi-cell battery as set forth in claim 1 wherein each of said cells include a metal screen positioned within and extending beyond the perimeter of said depolarizer.

3. A multi-cell battery as set forth in claims 1 or 2 wherein said lithium anode of each cell includes an annular flange having a central opening therethrough prior to compression, said depolarizer being coextensive with said anode and flange but extending beyond the perimeter of said anode.

4. A multi-cell battery of claim 3 wherein said depolarizer abuts the inner surface of said encasement means.

5. A multi-cell battery as set forth in claims 1 or 2 wherein said depolarizer is charge-transfer complex mixed with an excess of an halogen.

6. A multi-cell battery as set forth in claim 5 wherein said encasement means is a size and a shape of type "C" or type "D" battery.

* * * * *

UNITED STATES PATENT AND TRADEMARK OFFICE
CERTIFICATE OF CORRECTION

PATENT NO. : 4,317,869
DATED : March 2, 1982
INVENTOR(S) : Stanford G. Folus

It is certified that error appears in the above-identified patent and that said Letters Patent are hereby corrected as shown below:

Column 2, line 32, after "(Ser. No." delete "735,188" and substitute therefor -- 073,188 --;

Column 2, line 33, after "No." delete "4,125,833" and substitute therefor -- 4,276,362 --.

Signed and Sealed this

Fifteenth Day of June 1982

[SEAL]

Attest:

GERALD J. MOSSINGHOFF

Attesting Officer          Commissioner of Patents and Trademarks